United States Patent [19]
Wieczorek et al.

[11] Patent Number: 6,125,278
[45] Date of Patent: Sep. 26, 2000

[54] METHOD FOR OPTIMIZING RESOURCE ALLOCATION BASED ON SUBSCRIBER TRANSMISSION HISTORY

[76] Inventors: Alfred A. Wieczorek, 2336 California St. #4, Mountain View, Calif. 94040; Jeffrey D. Smith, 13240 NW. 12th Ct., Sunrise, Fla. 33323; Randall L. Moyers, 12325 SW. 1st St., Coral Springs, Calif. 33071; Ketan M. Shah, 7801 SW. 70th St., Miami, Fla. 33143

[21] Appl. No.: 09/122,735

[22] Filed: Jul. 27, 1998

[51] Int. Cl.$^7$ ...................................................... H04Q 7/20
[52] U.S. Cl. ...................... 455/437; 455/440; 455/453; 455/456
[58] Field of Search .................................. 455/437, 440, 455/452, 453, 456, 457, 525, 62, 441, 443, 450, 524, 509, 512, 513, 514

[56] References Cited

U.S. PATENT DOCUMENTS

| | | | |
|---|---|---|---|
| 5,214,789 | 5/1993 | George | 455/440 |
| 5,572,221 | 11/1996 | Marlevi et al. | 455/440 |
| 5,613,209 | 3/1997 | Peterson et al. | |
| 5,896,573 | 4/1999 | Yang et al. | 455/453 |
| 6,014,564 | 1/2000 | Donis et al. | 455/437 |

FOREIGN PATENT DOCUMENTS 335558  10/1989  European Pat. Off. .

Primary Examiner—Nguyen Vo
Assistant Examiner—Lester G. Kincaid
Attorney, Agent, or Firm—Andrew S. Fuller

[57] ABSTRACT

Communication resources are allocated within a radio communication system in anticipation of expected resource requirements using predictions based on information supplied by a subscriber unit. In one embodiment, the system uses the subscriber unit's location history to predict a future location (510, 520, 530). In another embodiment, the system uses radio capability information, along with environment information for the subscriber unit, to predict loading conditions for potential hand-over sites (610, 620, 630), and assigns the subscriber unit to one of the potential hand-over sites based on the predicted loading conditions (640).

10 Claims, 6 Drawing Sheets

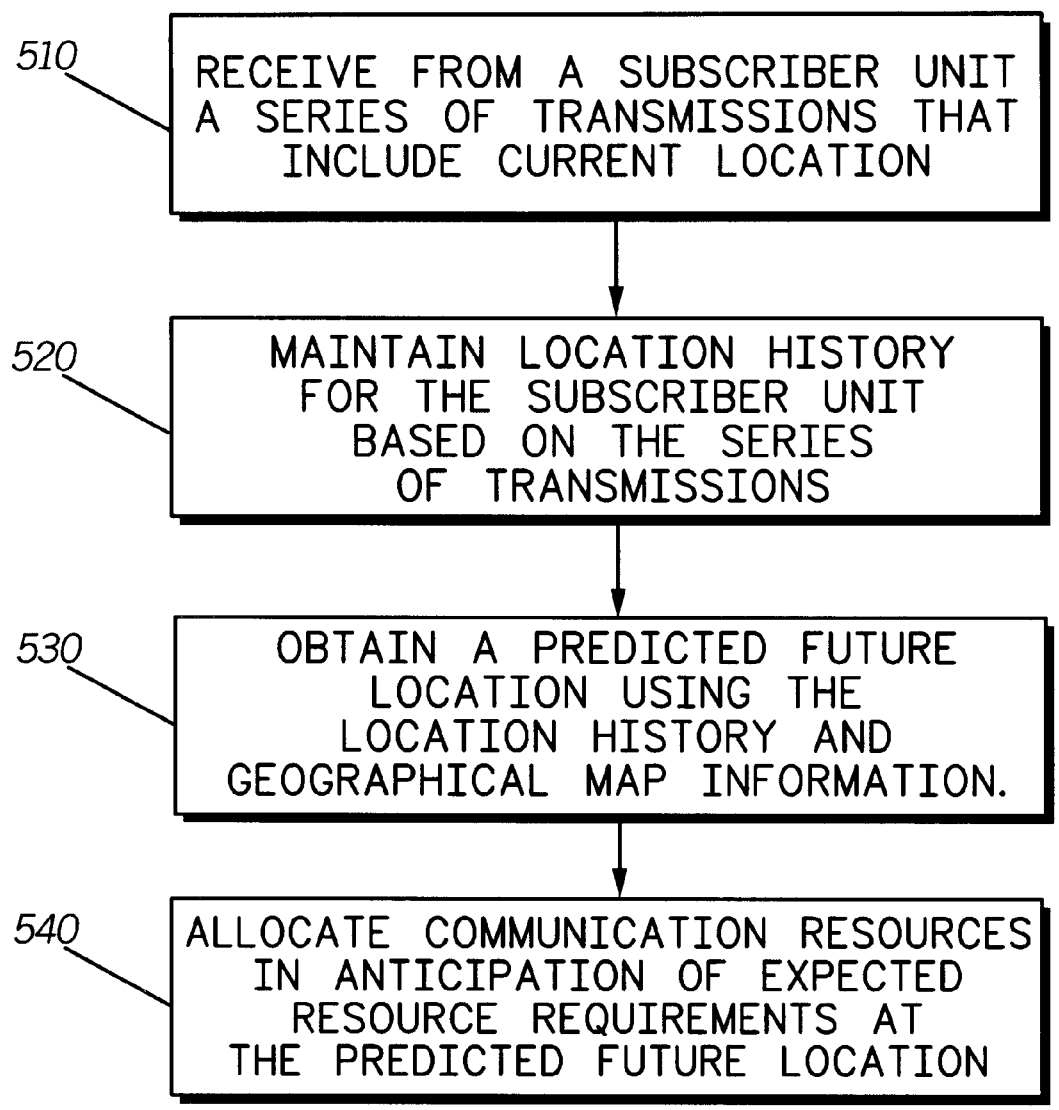

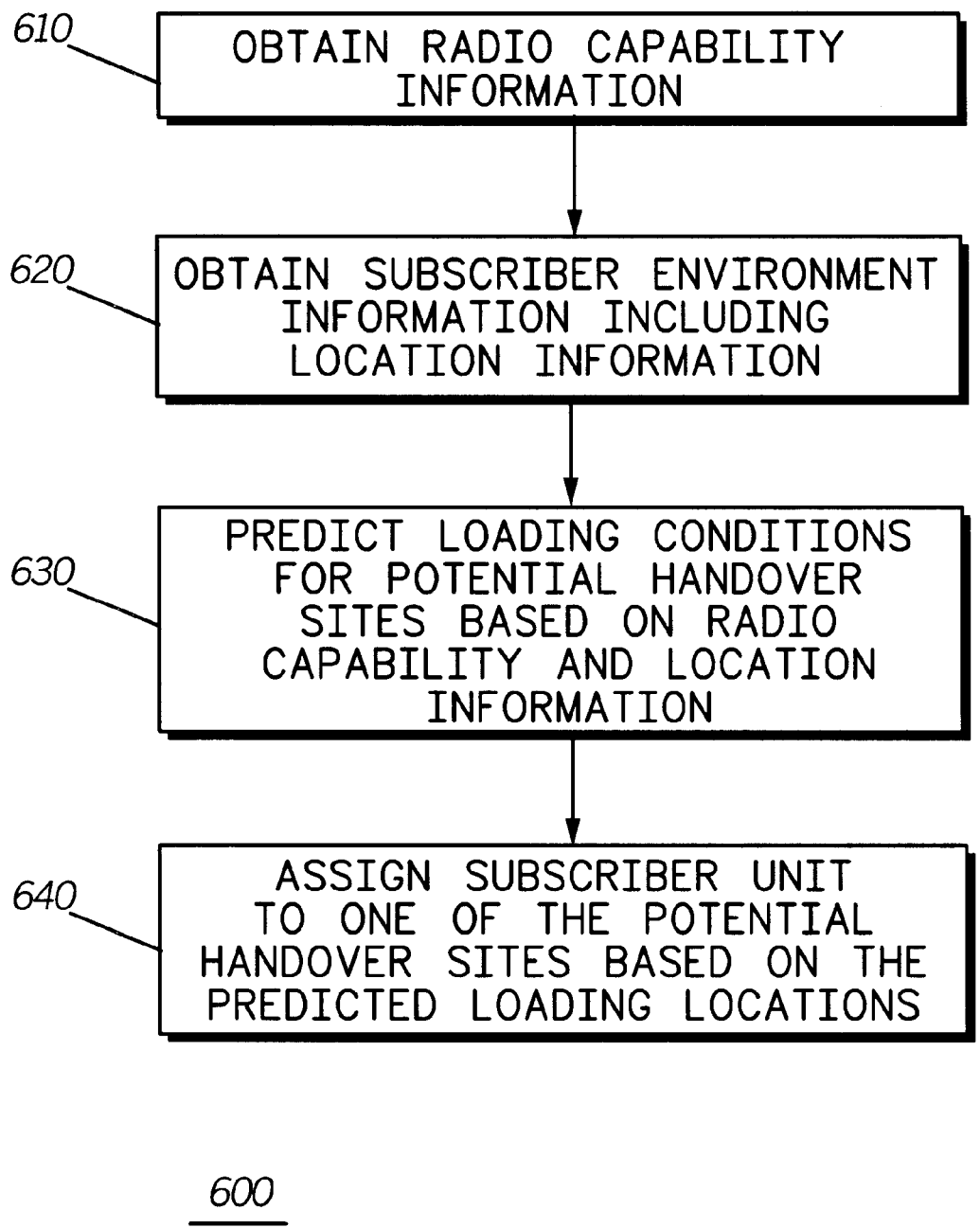

METHOD FOR OPTIMIZING RESOURCE ALLOCATION BASED ON SUBSCRIBER TRANSMISSION HISTORY

TECHNICAL FIELD

This invention relates in general to radio communication systems, and more particularly, to communication resource allocation in radio communication systems.

BACKGROUND OF THE INVENTION

A radio communication system, such as a cellular system, typically employs geographically dispersed transceiver sites to support subscriber units operating over a wide coverage area. Ordinarily, the sites are arranged such that each provides coverage for a particular geographic region, with some overlap in coverage. A subscriber unit interfaces with the radio communication system through a particular transceiver site, referred to herein as a server site or cell site. As a subscriber unit moves from one location to another, it may be advantageous to switch server affiliation from one site to another, in order to maintain a high-quality communication link. The process of switching server sites during an ongoing communication session is generally referred to in the art as hand-off or hand-over. The hand-off decision process usually involves the determination of the quality of signals between the subscriber unit and its server site, and the availability and suitability of other potential server sites that may be in communication range of the subscriber unit. The hand-off decision may be made using information gathered by the server site, information gathered by the subscriber unit, or a combination of both.

As subscriber units move about a system's coverage area, different loading conditions are created at the various server sites. To accommodate the subscriber units, communication resources, such as frequencies and time slots, must be made available as needed at each server site. When a subscriber unit requests resources that are unavailable, the results can include failure to establish a communication session, or even loss of an existing communication link. The problem of optimizing communication resource allocation is prevalent in multi-site systems.

It is desirable to enable a system to allocate communication resources to accommodate differing loading conditions as subscriber units move within a coverage area supported by different server sites. Preferably, such resource allocation is done in a manner that reduces dropped calls, and unacceptable delays when traversing between sites. Therefore, a new method for optimizing resource allocation in a radio communication system is needed.

BRIEF DESCRIPTION OF THE DRAWINGS

FIG. 5 is a flowchart of procedures used by the system to allocate communication resources, in accordance with the present invention.

FIG. 6 is a flowchart of procedures used by the system to provide hand-over site information to a subscriber unit, in accordance with the present invention.

DETAILED DESCRIPTION OF THE PREFERRED EMBODIMENT

Figure 1:
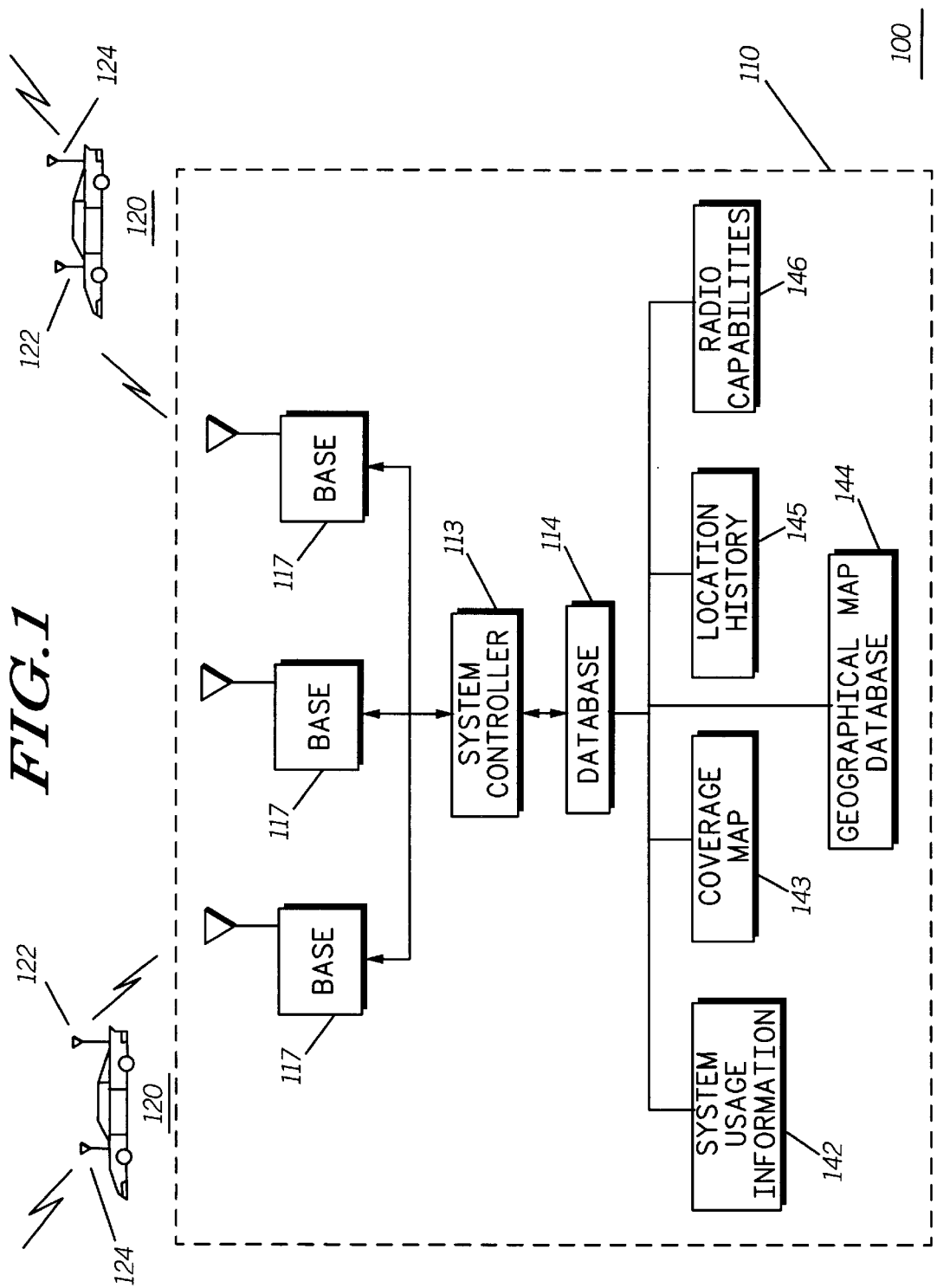
FIG. 1 is a block representation of a communication system, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides for optimization of communication resource allocation at the infrastructure equipment of a radio communication system, using information supplied by the subscriber unit. In the preferred embodiment, the system obtains a predicted future location for a subscriber unit using location information supplied by the subscriber unit. The system allocates communication resources in anticipation of expected resource requirements for the subscriber unit at the predicted future location. In another aspect of the present invention, the system uses radio capability information, along with environment information for the subscriber unit, to predict loading conditions for potential hand-over sites, and assigns the subscriber unit to one of the potential hand-over sites based on the predicted loading conditions.

FIG. 1 shows a block diagram of a radio communication network 100 operating in accordance with the present invention. In the preferred embodiment, the communication network 100 provides a radio network infrastructure equipment 110, also referred to herein as the "system", that supports telephone, dispatch, data, and other communication services over a wireless network. The infrastructure equipment 110 supports a particular coverage area, and subscriber units 120 interface with the infrastructure equipment 110 when in the particular coverage area. Each subscriber unit 120 includes a receiver 124 for receiving present location information, and a transceiver 122 for communicating with the infrastructure equipment 110. The subscriber units 120 are mobile and travel within the coverage area, and therefore change geographic locations. A more detail description of a subscriber unit 120 is presented below.

The infrastructure equipment 110 includes several base stations or server sites 117 that are coupled to a system controller 113. The base stations 117 comprise a radio transceiver which operates to communicate over wireless radio frequency links to the subscriber units 120. Ordinarily, the base stations 117 are organized to support a plurality of channels, that may comprise different frequencies, or different time slots on one or more frequencies. Generally, the channels include a control channel for the communication of control information between the subscriber units 120 and the system controller 113, and voice and/or data channels to support the general communication services.

The base stations of 117 are coupled to the system controller 113 through wired or wireless links. The system controller 113 performs management functions for the radio communication system 110 including resource allocation, communication signal routing, base station coordination, access control, and the like. The infrastructure equipment 110 further includes a database 114, that contains critical information needed by the system controller 113 to manage communications within the system. Such information typically includes subscriber unit identifiers, talk group configurations, access control information, and other management information.

According to the present invention, the database 114 also includes a variety of data that supports communication resource allocation. For example, the database includes system usage information 142 that is used to determine system loading conditions. Coverage map data 143 provides information on the geographic location of server sites, and the capabilities of those server sites. A geographical map data 144 provides topographical information of the system's coverage area, including the location of streets, highways, and other travel routes that may be traversed by subscriber units. Location history data 145 comprises a history of location information as reported by particular subscriber units. A radio capabilities data section 146 stores radio capability information as reported by a subscriber unit, or as derived from other sources.

Figure 2:
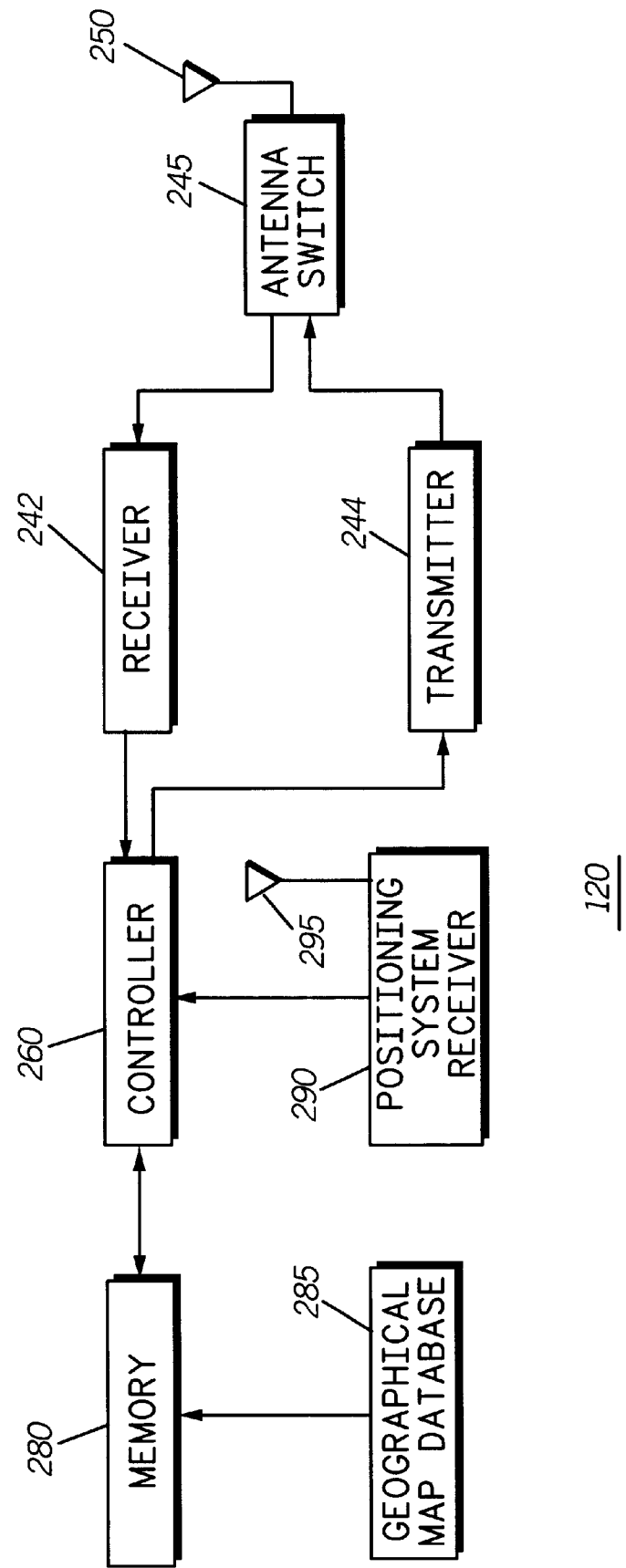
FIG. 2 is a block diagram of a subscriber unit, in accordance with the present invention.

FIG. 2 shows a block diagram of the subscriber unit 120, in accordance of the present invention. Preferably, the subscriber unit 120 is a two-way mobile or portable radio, capable of receive and transmit operations using well-known principles. A controller 260 uses instructions and data from an electrical coupled memory portion 280 to control the overall operation of the subscriber unit 120. The controller 260 is electrically coupled to a receiver 242 and to a transmitter 244, which are both coupled through an antenna switch 245 to an antenna 250. For receive operations, communication signals are received by the antenna 250 and are selectively processed by the receiver 242. Similarly, for transmit operations, communication signals are processed by the transmitter 244 and radiated through the antenna 250. The transmitter 244 and the receiver 242 operates under the control of the controller 260. The subscriber unit also includes a positioning system receiver 290, such as a global positioning system (GPS) receiver, and an associated antenna 295. The positioning system receiver 290 is operable to receive present location information, in a manner well-known in the art. The positioning system receiver 290 operates under the control of the controller 260.

According to the present invention, the subscriber unit 120 provides current location information as received via the positioning system receiver 290. The subscriber unit 120 also selectively provides route information and/or predicted future location information using a geographic map database 285 stored in memory 280.

Figure 3:
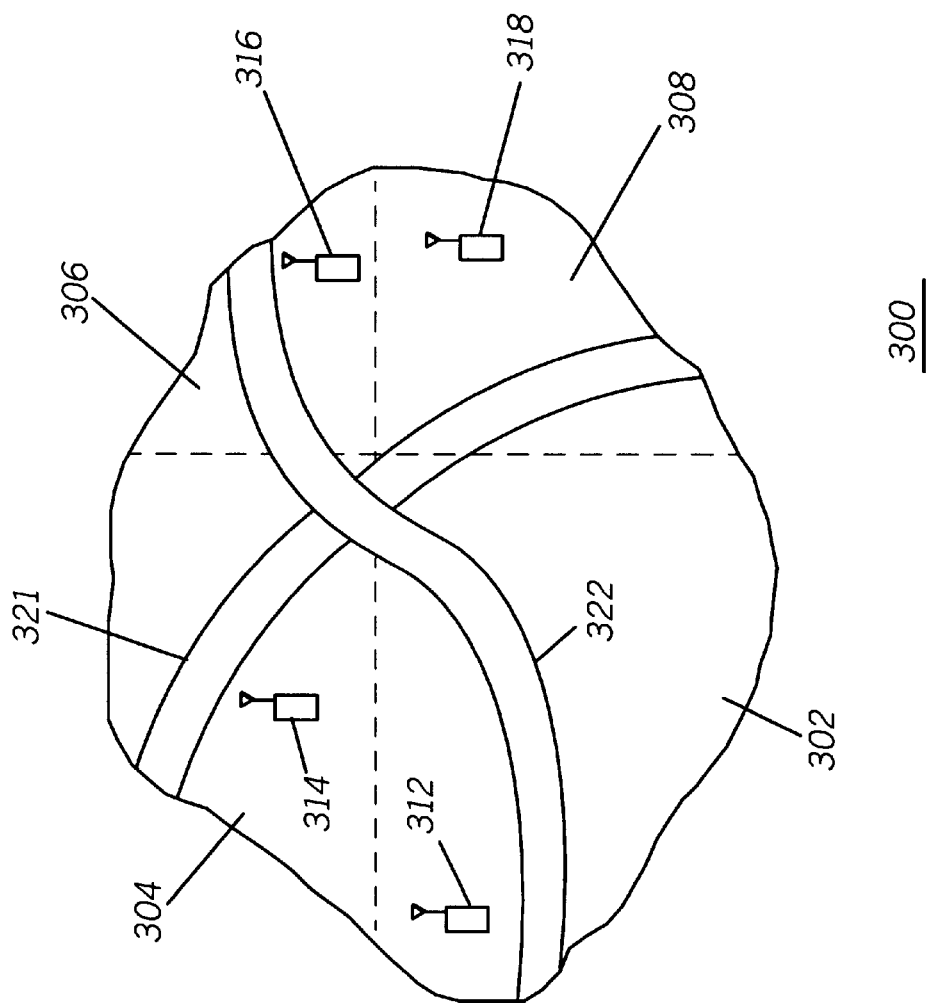
FIG. 3 is a graphical depiction of a coverage area in which server sites are superimposed on a geographical map, in accordance with the present invention.

FIG. 3 is a graphical representation of a coverage map 300 as stored by the system infrastructure 110, in accordance with the present invention. The coverage map 300 provides information on the location of the base stations or server sites making up the system infrastructure, and their respective coverage regions. Further, the coverage map 300 includes topographical information such as the location of major streets and highways. Accordingly, the coverage map shows server sites 312, 314, 316, 318, associated with their respective coverage regions 302, 304, 306, 308. The coverage map also shows two major highways 321, 322 that traverse the coverage area.

Figure 4:
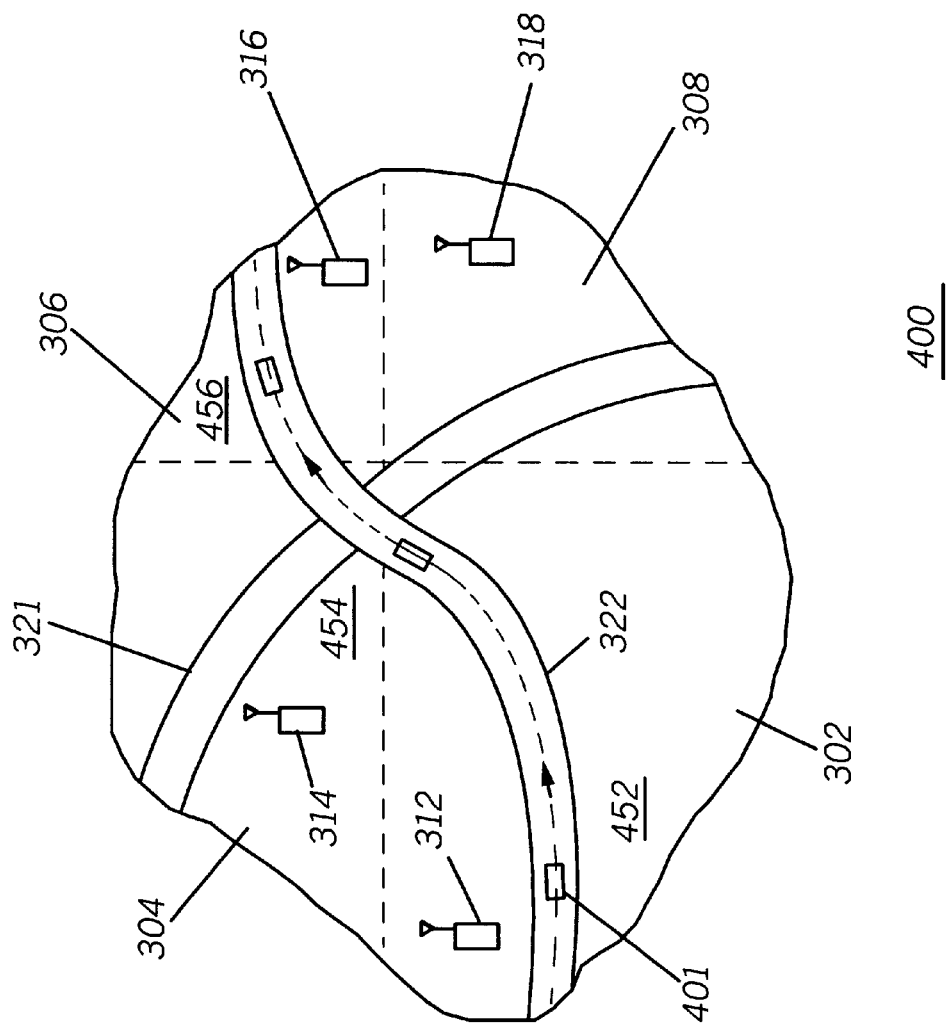
FIG. 4 shows a subscriber unit at various locations as it moves within the coverage area of FIG. 3, in accordance with the present invention.

FIG. 4 shows a subscriber unit 401 at various locations 452, 454, 456 as the subscriber unit 401 moves through the coverage area 300. FIG. 5 shows a flowchart of procedures 500 used for interaction between the subscriber unit and the system infrastructure equipment, in accordance with the present invention. Referring to FIGS. 4 and 5, at location 452, the subscriber unit is within the coverage region 302 of the server site 312. Between location 452 and location 454, the subscriber unit transmits, and the system receives, a series of transmissions that include current location information, step 510. During this period, the system maintains a location history for the subscriber unit based on the series of transmissions, step 520. The system uses this location history information and geographical map information to obtain a predicted future location for the subscriber unit, step 530.

The system then allocates communication resources in anticipation of expected resource requirements of the subscriber unit at the predicted future location, step 540. As necessary, the system reallocates communication resources in use by other subscriber units affiliated with the server site that services the region including the predicted future location, in preparation for the arrival by the subscriber unit at the predicted future location.

In determining the predicted future location, the system obtains map data containing possible routes for the subscriber unit, and compares the location history information with the map data obtained to arrive at the predicted future location. Note that the location history information may include time information, that together with the current location information, enables the calculation of the time at which the subscriber unit would arrive at the predicted future location. Thus, with respect to FIG. 4, by the time subscriber unit 401 arrives at location 454, the system is able to predict the future location 456, and is able to reallocate communication resources as necessary to support the subscriber unit at location 456.

FIG. 6 shows a flowchart of procedures 600 depicting another aspect of the present invention. As part of its normal process, the system obtains radio capability information, that is either supplied by the subscriber unit, or obtained from other sources, step 610. The radio capability information may include operating band information, operating protocol information, and other operational capabilities of the subscriber unit. In the preferred embodiment, this radio capability information is provided by subscriber unit to the system as part of a registration process. The system also receives from, or otherwise obtains for, the subscriber unit, subscriber environment information, including location information, received signal strength indicator (RSSI) information, cell affiliation information, and the like. The system uses the radio capability information, and location information, to predict loading conditions for potential hand-over sites, step 630. The system then uses a combination of the predicted future location, the RSSI, and the operational capabilities information, to allocate communication resources to the subscriber unit. In one embodiment, the system assigns the subscriber unit to one of the potential hand-over sites based on the predicted loading conditions, step 640.

An example will now be described with reference to FIG. 4. At location 452, as part of the process of logging on the system, the subscriber unit 401 searches for an available control channel corresponding to its band and protocol capabilities. The system queries the subscriber unit for its band and protocol capabilities, and assigns the unit a particular protocol and band, as determined by the system, to provide the best available communication channel. The system enters the subscriber unit's location and RSSI information into its database, which database includes information from various units operating within the coverage area. Between locations 452 and 454, the system receives a series of transmissions from the subscriber unit 401, as the subscriber unit moves about within the system's coverage area. The system tracks the subscriber unit's movement on its system map and maintains the unit's location history to indicate the current direction of travel. Using the knowledge of the travel routes within the coverage area, and the unit's direction and speed, the system predicts the next likely site with which the subscriber unit will be affiliated.

At location 454, the subscriber unit is about to enter the coverage area 304 for the server site 314. But there are no resources available at server site 314. However, the system has predicted that the subscriber unit will be at location 456, it's predicted future location, and has also determined that communication resources will be available at server site 316 when the subscriber unit is at location 456. In this example, the subscriber unit has capabilities in the 800 MHz and 900 MHz band, and can operate using the integrated Dispatch Enhanced Network (iDEN™) and the Advanced Mobile Phone Service (AMPS) protocol. At location 454, the subscriber unit is operating on the 800 MHz band using the iDEN™ protocol. In a first scenario, there are no 800 MHz channels available at server site 316, and the system directs the subscriber unit to switch to the 900 MHz band to continue the call. In a second scenario, there are no channels available under the iDEN™ protocol at the server site 316, but there are channels available using the AMPS protocol. In this second scenario, the system causes another subscriber unit operating under the iDEN™ protocol, but which has capabilities under the AMPS protocol, to switch service to the AMPS protocol. The system is then able to assign a channel under the iDEN™ protocol to the subscriber unit 401, when the subscriber unit arrives at location 456.

The present invention provides significant advantages over the prior art. By keeping track of the location history of a subscriber unit, the system is able to predict a future location for the subscriber unit. The predicted location information together with information on the capabilities of subscriber units within the system, is used by the system to allocate or reallocate communication resources in an optimized manner.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for optimizing communication resource allocation in a radio communication system, comprising the steps of:
   obtaining a predicted future location for a subscriber unit using information supplied by the subscriber unit;
   receiving operational capabilities information, comprising a plurality of operating bands and/or a plurality of of operating protocols directly from the subscriber unit;
   reallocating communication resources in use by other subscriber units affiliated with a communication site that services the predicted future location, in preparation for arrival by the subscriber unit at the predicted future location, based at least in part on the received operational capabilities information;
   allocating communication resources in anticipation of expected resource requirements for the subscriber unit at the predicted future location based on a combination of the predicted future location, and operational capabilities information.

2. The method of claim 1, wherein the step of obtaining a predicted future location, comprises the steps of:
   receiving from the subscriber unit a series of transmissions that includes current location information;
   maintaining location history information corresponding to the subscriber unit based on the series of transmissions; and
   obtaining the predicted future location for the subscriber unit using the location history information.

3. The method of claim 2, wherein the step of obtaining the predicted future location, comprises the steps of obtaining geographic map information containing possible routes for the subscriber unit, comparing the location history information with map information obtained.

4. The method of claim 2, further comprising the steps of:
   receiving operating band information from the subscriber unit; and
   reallocating communication resources in use by other subscriber units affiliated with a communication site that services the predicted future location, in preparation for arrival by the subscriber unit at the predicted future location, based in part on the operating band information received from the subscriber unit.

5. The method of claim 2, further comprising the steps of:
   receiving operating protocol information from the subscriber unit; and
   reallocating communication resources in use by other subscriber units affiliated with a communication site that services the predicted future location in preparation for arrival by the subscriber unit at the predicted future location, based in part on the operating protocol information received from the subscriber unit.

6. A method for optimizing system resource allocation in a multi-site radio communication system, comprising:
   receiving from a subscriber unit operational capabilities information, including a plurality of operating bands and/or a plurality of operating protocols, and a series of transmissions that include current location information;
   maintaining location history information corresponding to the subscriber unit based on the series of transmissions;
   predicting a future location pertaining to the subscriber unit using the location history information; and
   allocating communication resources in anticipation of expected resource requirements for the subscriber unit at the predicted future location, based on a combination of the predicted future location, and operational capabilities information.

7. The method of claim 6, further comprising the steps of:
   receiving signal strength from the subscriber unit; and
   allocating communication resources to the subscriber unit based on a combination of the predicted future location, and the signal strength and operational capabilities information.

8. The method of claim 7, wherein the step of allocating communication resources to the subscriber unit comprises the step of reallocating communication resources used by other subscriber units based on a combination of the predicted future location and operational capabilities information received from the subscriber unit.

9. A method, comprising the steps of, as a part of a handover sequence:
   receiving, directly from a subscriber unit, radio capability information, including operating band and/or operating protocol;
   receiving subscriber unit environment information, including location information, and cell affiliation information;
   predicting loading conditions for potential handover sites based on the radio capability information and the location information; and
   assigning the subscriber unit to one of the potential handover sites based on the predicted loading conditions.

10. The method of claim 9, further comprising the steps of:
   receiving from a subscriber unit a series of transmissions that includes current location information;
   maintaining location history information corresponding to the subscriber unit based on the series of transmissions; and
   determining potential handover sites using the location history information.

* * * * *